United States Patent
Buschbeck et al.

(10) Patent No.: US 9,527,136 B2
(45) Date of Patent: Dec. 27, 2016

(54) CLAMPING DEVICE FOR A BALANCING MACHINE

(75) Inventors: Andreas Buschbeck, Bickenbach (DE); Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 205 days.

(21) Appl. No.: 14/127,012

(22) PCT Filed: Jul. 27, 2012

(86) PCT No.: PCT/EP2012/064760
§ 371 (c)(1),
(2), (4) Date: Dec. 17, 2013

(87) PCT Pub. No.: WO2013/017537
PCT Pub. Date: Feb. 7, 2013

(65) Prior Publication Data
US 2014/0117630 A1    May 1, 2014

(30) Foreign Application Priority Data

Jul. 29, 2011   (DE) .................. 10 2011 052 308

(51) Int. Cl.
*B23B 31/117*   (2006.01)
*B23B 31/10*   (2006.01)
(Continued)

(52) U.S. Cl.
CPC ............. *B23B 31/10* (2013.01); *B23B 31/005* (2013.01); *B23B 31/006* (2013.01);
(Continued)

(58) Field of Classification Search
CPC .... B23B 31/005; B23B 31/006; B23B 31/101; B23B 31/261; B23B 2260/136; B23B 2270/12; B23B 31/10; Y10T 279/17666
See application file for complete search history.

(56) References Cited

U.S. PATENT DOCUMENTS 4,540,187 A    9/1985 Morawski et al.
4,714,389 A   12/1987 Johne
(Continued)

FOREIGN PATENT DOCUMENTS

DE    35 04 905 A1    8/1986
DE    38 34 192 A1    4/1990
(Continued)

OTHER PUBLICATIONS

International Search Report of PCT/EP2012/064760, mailed Nov. 9, 2012.
DIN 69893-1, Jan. 1996, total of 7 pages.

*Primary Examiner* — Eric A Gates
*Assistant Examiner* — Paul M Janeski
(74) *Attorney, Agent, or Firm* — Collard & Roe, P.C.

(57) ABSTRACT

Disclosed is a clamping device of a balancing machine for coaxially clamping a toolholder on a spindle rotary about an axis of rotation (3), in which the coupling shank (8) is supported in the receiving socket only on discrete supports (11-15) which are spaced from each other circumferentially and lie in three relatively spaced engagement planes (E1, E2, E3) intersecting the axis of rotation (3). Four rigid discrete supports (11-14) are arranged in pairs in the first (E1) and the second (E2) engagement plane and combine to form a rigid support in a first radial direction. Formed in the third engagement plane (E3) lying between the first and the second engagement plane is a fifth discrete support (15) which effects a supporting function in a second radial direction opposite the first radial direction.

13 Claims, 4 Drawing Sheets

(51) Int. Cl.
*B23B 31/00* (2006.01)
*B23B 31/26* (2006.01)

(52) U.S. Cl.
CPC .......... *B23B 31/101* (2013.01); *B23B 31/261* (2013.01); *B23B 2260/136* (2013.01); *B23B 2270/12* (2013.01); *Y10T 279/17666* (2015.01)

(56) References Cited

U.S. PATENT DOCUMENTS

| | | | | |
|---|---|---|---|---|
| 5,322,304 | A * | 6/1994 | Rivin | B23B 31/006 279/103 |
| 5,595,391 | A * | 1/1997 | Rivin | B23B 31/006 279/103 |
| 6,250,155 | B1 | 6/2001 | Hormann et al. | |
| 6,599,068 | B1 * | 7/2003 | Miyazawa | B23B 31/006 279/103 |
| 7,284,938 | B1 * | 10/2007 | Miyazawa | B23B 31/006 409/141 |
| 7,427,179 | B2 * | 9/2008 | Smith | B23B 31/006 408/143 |
| 8,043,036 | B2 * | 10/2011 | Cook | B23B 31/006 408/143 |
| 2005/0019124 | A1 * | 1/2005 | Rivin | B23B 31/006 409/234 |
| 2015/0209870 | A1 * | 7/2015 | Haimer | B23B 31/006 279/133 |

FOREIGN PATENT DOCUMENTS

| | | |
|---|---|---|
| DE | 41 10 857 A1 | 10/1992 |
| DE | 42 41 583 A1 | 3/1994 |
| DE | 297 09 272 U1 | 7/1997 |
| DE | 199 61 451 A1 | 6/2001 |
| EP | 0 743 119 A1 | 11/1996 |
| JP | H08-8042 Y2 | 3/1996 |
| JP | H09-038837 A | 2/1997 |

* cited by examiner

CLAMPING DEVICE FOR A BALANCING MACHINE

CROSS REFERENCE TO RELATED APPLICATIONS

This application is the National Stage of PCT/EP2012/064760 filed on Jul. 27, 2012, which claims priority under 35 U.S.C. §119 of German Application No. 10 2011 052 308.1 filed on Jul. 29, 2011, the disclosure of which is incorporated by reference. The international application under PCT article 21(2) was not published in English.

This invention relates to a clamping device of a balancing machine for coaxially clamping a toolholder on a spindle rotary about an axis of rotation, said spindle including at a frontal end a coaxial receiving socket and said toolholder including a coupling shank axially insertable into the frontal end of the spindle, said coupling shank being adapted to be axially clamped in place in the receiving socket by means of releasable clamping means, and wherein inner locating surfaces in the receiving socket, outer locating surfaces on the coupling shank and, where applicable, further engaging surfaces cooperate in order to support the toolholder in coaxial position radially and axially on the spindle.

A clamping device of the type referred to is known from DE 199 61 451 A1. It serves to connect rotary tools such as drills, milling cutters or grinding tools along with their toolholders with the spindle of a balancing machine in an accurately centered position in order to be able to measure any existing unbalance with the required accuracy. The known clamping device includes as central locating means an arrangement of support surfaces encompassing the coupling shank in centrally located fashion, being resilient essentially in a direction transverse to its outer envelope surface or deflectable against spring force and comprised of a plurality of radially resilient tongues circumferentially spaced from each other and protruding from a base ring held on a body connected to the machine spindle. Provided at an axial distance to the resilient support surface arrangement is another rigid support surface arrangement formed by annular surfaces on the body and the coupling shank.

The problem of a resilient support surface arrangement resides in that the position of the support surfaces is not accurately defined and may be affected, for example, by friction between the support surfaces and their mating surfaces. Each new clamping of a tool shank may therefore result in a slight variation of the centered position whereby the repeat accuracy of the clamping operation may be impaired.

It is an object of the present invention to provide a clamping device of the type initially referred to which enables toolholders to be centrally located and clamped in a receiving socket of the spindle with repeat accuracy and at moderate clamping forces.

This object is accomplished by a clamping device as described herein. Advantageous embodiments of the clamping device are also described herein.

According to the invention, in a clamping device of a balancing machine for coaxially clamping a toolholder on a spindle rotary about an axis of rotation, the spindle includes at a frontal end a coaxial receiving socket, and the toolholder includes a coupling shank axially insertable into the frontal end of the spindle, said coupling shank being adapted to be axially clamped in place in the receiving socket by means of releasable clamping means, with the receiving socket having arranged therein inner locating surfaces cooperating with outer locating surfaces on the coupling shank in order to support the coupling shank in a centrally located position radially and, where applicable, axially on the spindle. According to the invention, the supporting of the coupling shank in the receiving socket takes place in at least one first engagement plane intersecting the axis of rotation only on discrete supports spaced from each other circumferentially, wherein a first and a second one of the discrete supports are formed by the inner and outer locating surfaces and define, in combination, a rigid support in a first radial direction, and wherein a third one of the discrete supports is formed by a radially adjustable first supporting element and defines a support in a second radial direction opposite the first radial direction.

The clamping device of the present invention combines the properties of a rigid support of the coupling shank with those of a radially yielding support in advantageous manner. The rigid first and second discrete supports ensure that the coupling shank is positioned in the receiving socket of the spindle with a high repeat accuracy. Their inner and outer locating surfaces are held in relative engagement by the radially adjustable supporting element which is capable of compensating for any production-related diameter variations between the inner diameter of the receiving socket and the outer diameter of the coupling shank in the plane of engagement. Limiting the central locating function to discrete supports affords the further advantage that the effects of friction on the centered position are reduced and lower clamping forces suffice to accomplish a defined and accurately repeatable centered position. Any over-determination of the support determining the centered position of the coupling shank and any variations of position resulting therefrom on repeated clamping operations are avoided.

In contrast to the known clamping device initially referred to, according to the invention diameter variations are compensated for only in a radial direction determined by the position of the two rigid discrete supports. This may result in errors occurring with respect to the accurate central location of the coupling pin in the receiving socket. Such locating errors can however be compensated for in the balancing process by turning through 180° and therefore have no adverse effect on the unbalance measurement.

The supporting of the coupling shank may be accomplished in a second plane of engagement in analog manner on discrete supports only. To this effect, inner locating surfaces on the receiving socket and outer locating surfaces on the coupling shank may form one fourth and one fifth rigid discrete support, said supports being circumferentially spaced from each other and combining to form a support in a radial direction. Associated with the fourth and fifth supports in the second plane of engagement may be a sixth support formed by a radially adjustable supporting element providing a supporting function in a radial direction opposite the direction of the rigid support. Owing to the supports in both planes of engagement, an accurately defined alignment of the toolholder relative to the spindle is achieved, with the manufacturing accuracy of the inner and outer locating surfaces of the rigid supports determining the accuracy of the desired coaxial position of toolholder and spindle and ensuring that spindle and toolholder repeatedly return to the same position upon disengagement.

According to another proposal of the invention, an accurately repeatable coaxial alignment of the coupling shank in the receiving socket of the spindle may also be accomplished using only five discrete supports by arranging them in spaced relationship in three planes of engagement intersecting the axis of rotation, wherein in a first engagement plane a first and a second one of the discrete supports are formed by inner and outer locating surfaces and define in combination a second rigid support in a first radial direction, wherein in a second engagement plane fourth and fifth discrete supports are formed by inner and outer locating surfaces and define in combination a second rigid support in the first radial direction, and wherein in a third engagement plane lying between the first and the second engagement plane a supporting element is arranged which forms a third discrete support and effects a supporting function in a second radial direction opposite the first radial direction.

The configuration using five supports is statically determined. Therefore, the supporting element forming the third discrete support may be radially adjustable or, alternatively, be rigid. The former approach is suitable when the coupling shank has a cylindrical envelope surface or when the outer locating surfaces of the coupling shank are sections of a common cylindrical envelope surface, because the adjustable supporting element may then be used to compensate for diameter variations and produce a defined radial clamping force. When the coupling shank is formed with a conical envelope surface or when the outer locating surfaces of the coupling shank are sections of a common frusto-conical envelope surface, the supporting element defining the third discrete support may be rigid because the coupling shank bears against all rigid supports in the receiving socket by axial displacement. Any variations in diameter or in the conical shape are also compensated for by adaptation of the axial position of the coupling shank in the receiving socket.

In cases where the inner and outer locating surfaces are cylindrical and the supporting element is radially adjustable, it is necessary to provide for an axial support of the toolholder on the spindle. To this effect, the toolholder may include a radial engaging surface adapted to make engagement with an end surface on the spindle. If the toolholder is radially supported on discrete supports in one engagement plane only, it is necessary according to the invention to configure the axial support of the toolholder such as to effect an alignment of the axis of rotation of the toolholder parallel to the axis of rotation of the spindle. This may be accomplished by at least three axial supports between toolholder and spindle which form the corners of a triangle. Preferably, the axial supports lie in a plane normal to the axis of rotation.

According to another proposal of the invention, the radially adjustable third or sixth supporting element may be mounted for radial movement on the spindle or the toolholder and be radially adjustable against the force of a spring. Alternatively, the supporting element may be adjustable on the spindle or the toolholder by means of mechanical controls. Adjustability in opposition to the force of a spring affords the advantage for the supporting element to assume the proper position automatically, with the spring producing the necessary radial clamping force on the support.

The discrete supports may be manufactured in a variety of ways and are preferably arranged in the receiving socket. They may also be formed by a combination of inner and outer locating surfaces intersecting each other. Thus, for example, the inner locating surfaces in the receiving socket may be formed by separate ribs parallel to the axis, which cooperate with annular outer locating surfaces on the coupling pin, thereby producing discrete supports on the intersections of the surfaces. The inner locating surfaces of the supports may snugly engage the outer locating surfaces of the coupling shank, or alternatively, they may be shaped differently, for example, have a reduced curvature or be plane or curved in a convex shape.

The present invention will be explained in greater detail in the following with reference to embodiments illustrated in the accompanying drawing. In the drawing, FIG. 1 is a cross-sectional view of the spindle of a balancing machine with a toolholder received therein;

Figure 1:
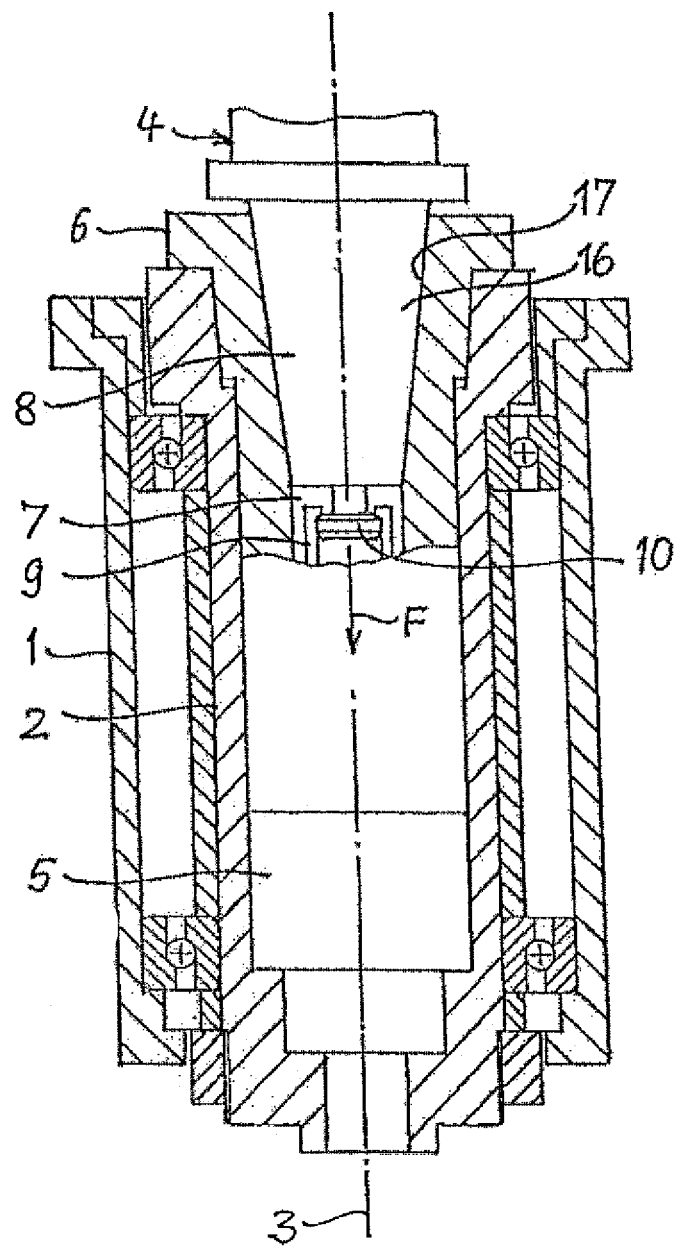

FIG. 1 shows a housing 1 intended for installation in a balancing machine. A spindle 2 is carried in the housing 1 for rotary movement about an axis of rotation 3. The spindle serves for the dynamic measurement of the unbalance of a toolholder 4 for tools driven at high speeds which include, for example, drills, milling cutters or grinding tools and may be driven in the balancing machine by means of a rotary drive mechanism not shown in the drawing. The spindle 2 has a central bore 5 accommodating an exchangeable adapter 6 fixedly screw-threaded to the spindle 2. The adapter 6 serves to adapt the accommodating hole of the spindle to a specific shape and size of the coupling means of the toolholder 4 to be measured. In the embodiment illustrated in the drawing, the adapter 6 has a receiving socket 7 configured to receive a coupling shank 8 which is arranged on the toolholder 4 and shaped in the form of a conventional steep taper shank having a frusto-conical outer locating surface 16. Also arranged in the adapter 6 is a pneumatically or hydraulically actuatable clamping device 9 which is configured to grip the clamping head 10 arranged at the free end of the coupling shank 8, pulling the coupling shank 8 axially into the receiving socket 7 at a force F and retaining it therein. The adapter 6 fits snugly with zero play within the bore 5 of the spindle 2, and its receiving socket 7 has a hollow conical inner surface 17 co-axial with the axis of rotation 3, whose taper angle matches the taper angle of the coupling shank 8.

Figure 2:
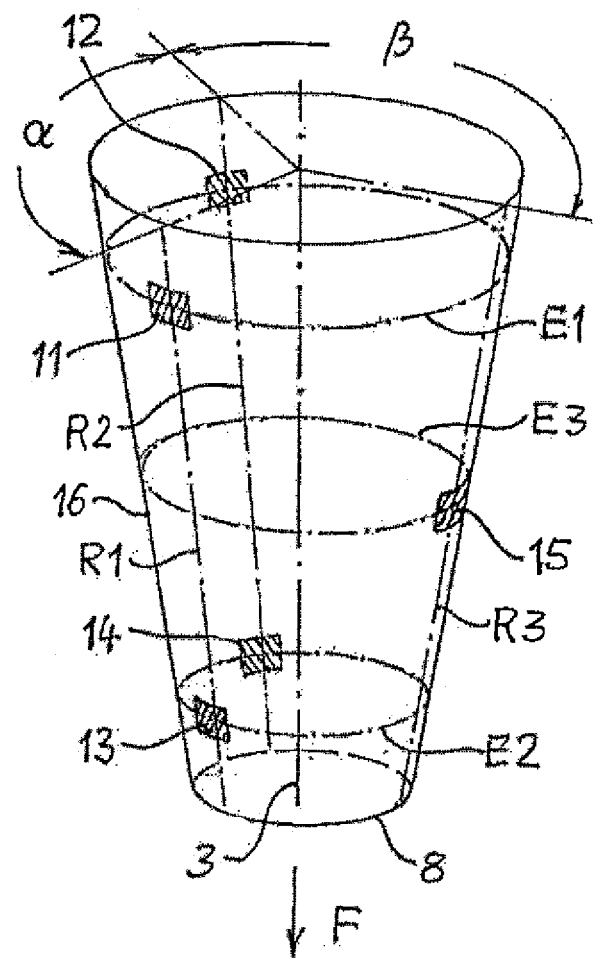
FIG. 2 is a schematic view of the discrete support of a toolholder in a spindle of FIG. 1.

When the coupling shank of a toolholder is received in the drive spindle of a machine tool, the coupling shank is drawn into the hollow conical receiving socket of the machine tool at a very high axial force in order to prevent any loosening of the fixed clamping of the toolholder and its displacement relative to the drive spindle during the machining of workpieces. The high axial force causes some minor elastic deformation of the toolholder and the area of the drive spindle receiving it, wherein to the positioning accuracy in clamping adverse effects, such as friction and form errors in the area of the locating surfaces, can be overcome. For unbalance measurement, clamping the toolholder at such a high axial force is however not necessary and accordingly not provided for cost reasons. The risk of clamping errors and an improperly centered position of the toolholder relative to the spindle of the balancing machine is therefore greater. To reduce this risk, the invention provides, as shown in FIG. 2, discrete supports 11 to 15 in the receiving socket 7 upon which the frusto-conical outer locating surface 16 of the coupling shank 8 takes support exclusively. The discrete supports 11 to 15 are formed of projections raised relative to the hollow conical inner surface 17 of the receiving socket 7, their surfaces forming inner locating surfaces which may be sections of a common hollow conical surface. The projections are rigid and fixedly connected with the adapter 6. They may be integrally formed with the adapter 6 or comprised of inserts or pads affixed in the receiving socket 7.

The centers of the supports 11 to 15 are arranged in parallel engagement planes E1, E2, E3 intersecting the axis of rotation 3 at right angles. Alternatively, it is also possible for the engagement planes E1 to E3 to intersect the axis of rotation 3 at a different angle. Arranged in the upper first engagement plane E1 are the supports 11, 12, in the second lower engagement plane E2 the supports 13, 14, and in the middle third engagement plane E3 is the support 15. Furthermore, the centers of the supports 11, 13 lie in a first plane R1 radial to the axis of rotation 3, and the centers of the supports 13, 14 lie in a second radial plane R2, with the two radial planes including an angle α of preferably 120°, but which may also be smaller or greater than 120°. The center of the support 15 is located in a third radial plane R3 preferably bisecting the angle α, but which may also be arranged at a different location. The angle β included between the third radial plane R3 and the first R1 or second R2 radial plane should in any case be significantly smaller than 180°.

The arrangement of the discrete supports 11 to 15 as described results in a statically determined support of the outer locating surface 16 of the coupling shank 8. The centered position of the coupling pin is thus determined exclusively by the five discrete supports 11 to 15, with a relatively low axial force F being sufficient to urge the coupling shank 8 against the inner locating surfaces of the supports 11 to 15 in a defined manner.

Figure 3:
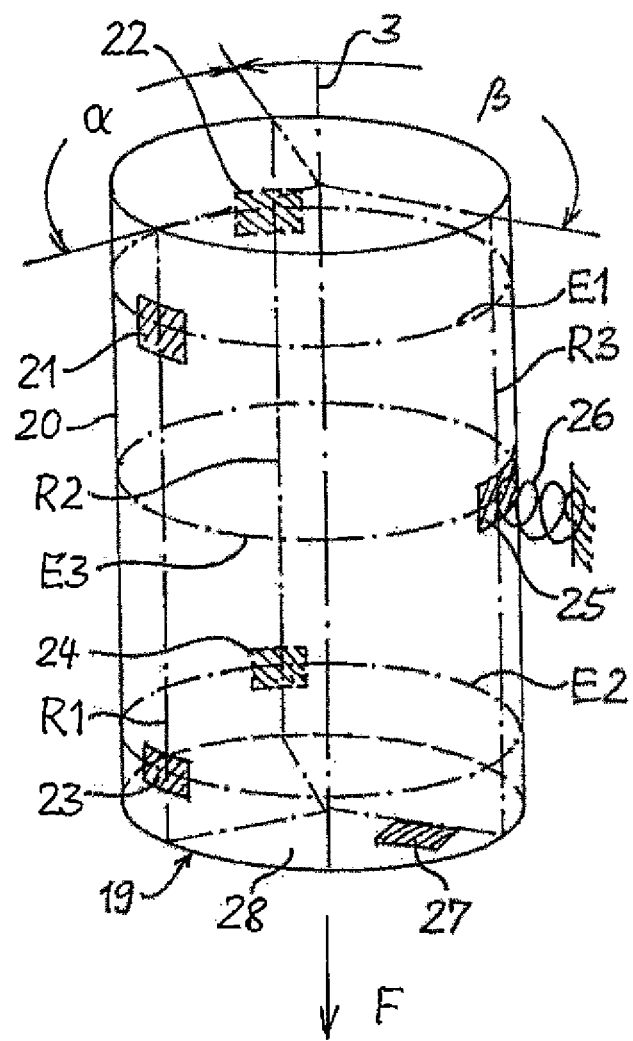
FIG. 3 is a schematic view of the discrete support of a cylindrical toolholder.

FIG. 3 illustrates the supporting of a coupling shank 19 of a length comparable to the coupling shank 8, with the coupling shank 19 having a cylindrical outer locating surface 20. Similar to the embodiment of FIG. 2, an analog arrangement provides in the receiving socket five supports 21 to 25 formed by inner locating surfaces situated in three parallel engagement planes E1, E2, E3 and radial planes R1, R2, R3. The radial distance between the supports 21 to 24 and the axis of rotation 3 is equal. Considering that the cylindrical outer locating surface 20 cannot be clamped radially by an axially acting force F, the support 25 is formed by a radially adjustable supporting element capable of being urged radially inwardly by the force of a spring 26. Alternatively, the support 25 may also be formed by a pressure element radially adjustable by a mechanical means as, for example, an adjusting screw. The radially adjustable supporting element urges the coupling shank 19 with its outer cylindrical surface 20 in a radial direction against the rigid supports 21 to 24 arranged in the receiving socket, thereby clamping it radially in a position coaxial with the axis of rotation 3 with a high degree of repeat accuracy. The coaxial position of the coupling shank is therefore determined exclusively by the rigid supports 21 to 24, being accordingly repeatable on each change of the coupling shank. By suitably dimensioning the spring 26, the radial clamping force can be assigned a magnitude advantageous for the individual application. In axial direction, the supports 21 to 25 are unable to support the coupling shank 19 on the outer locating surface 20. To determine the axial position and the support against the axial force F of the clamping device, it is therefore necessary to provide an axially acting support 27 which cooperates with a radially extending engaging surface 28 of the coupling shank 19.

In lieu of a single adjustable support 25, in the embodiment of FIG. 3 two supports may be arranged which are formed by a radially adjustable supporting element, for example, one arranged in the engagement plane E1 and one in the engagement plane E2. In this way it is possible to accomplish a better distribution of the radial clamping force to the individual discrete supports.

Figure 4:
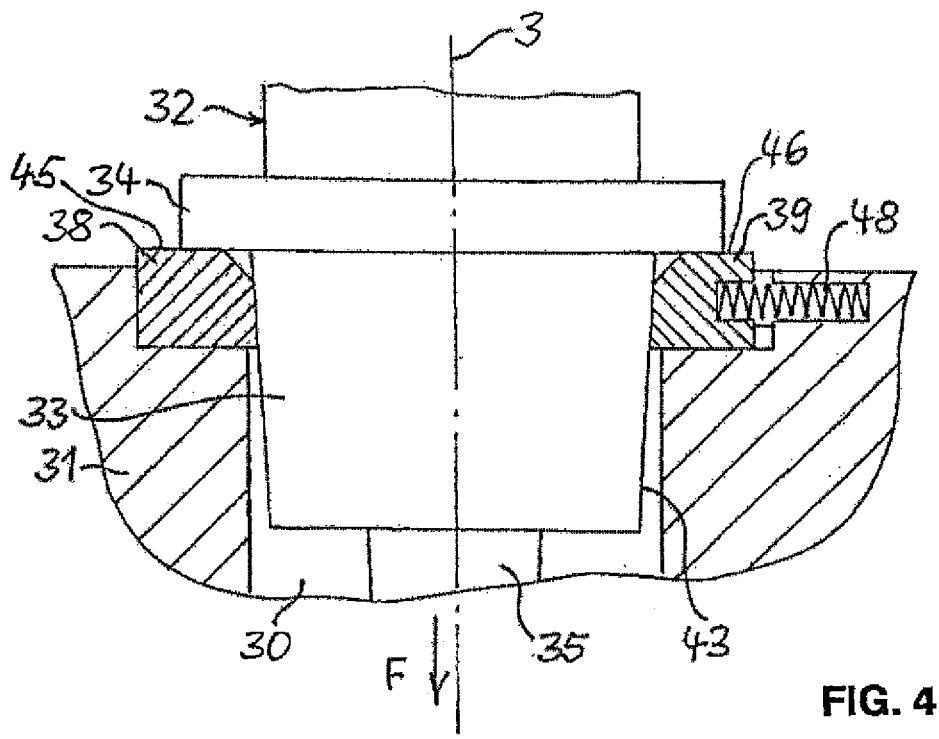
FIG. 4 is a cross-sectional view, taken along the line IV-IV, of another embodiment of a spindle of a balancing machine with a toolholder received therein.
Figure 5:
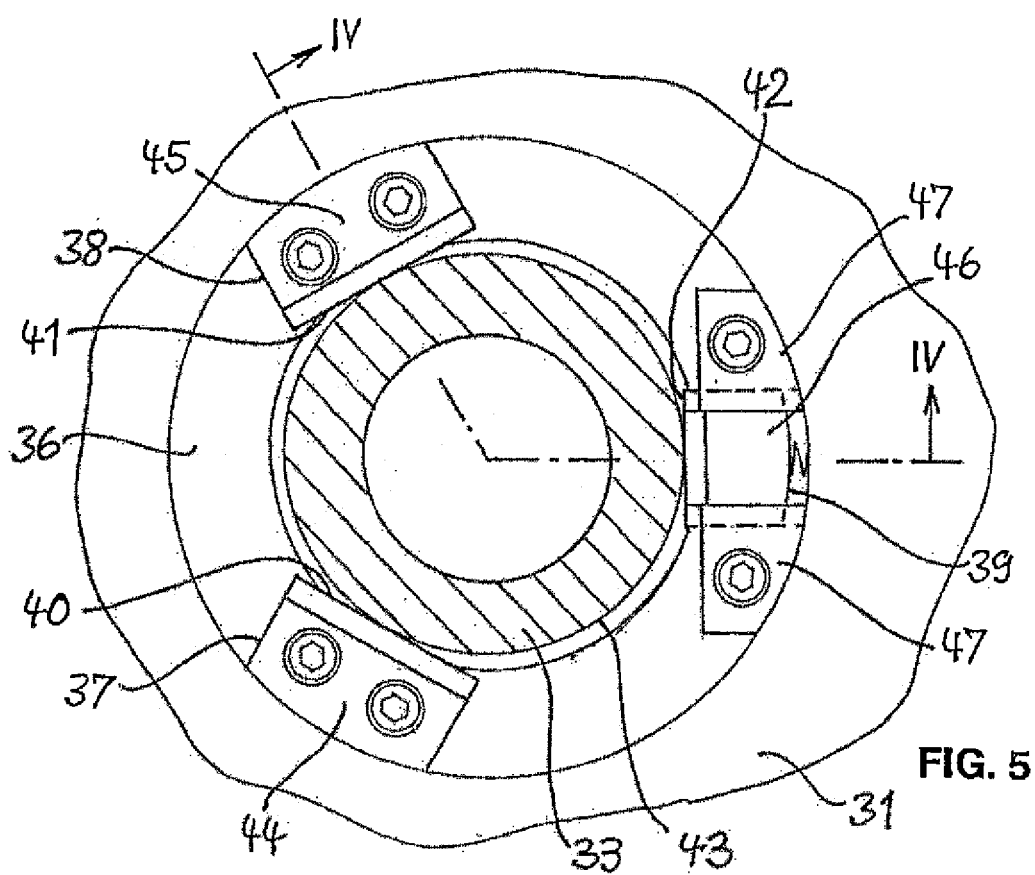
FIG. 5 is a partly sectional view, taken from above, of the embodiment of FIG. 4.

In the embodiment shown in FIGS. 4 and 5, a toolholder 32 is held clamped in the receiving socket 30 of a spindle 31 and includes a coupling shank 33 in the form of a hollow shank cone of reduced axial length. Adjoining the coupling shank 33 of the toolholder 32 is an annular flange 34 serving for axial support and axially parallel alignment of the toolholder 32 relative to the axis of rotation 3 of the spindle 31. The toolholder 32 is clamped in conventional manner by means of a clamping device 35 which is arranged on the spindle 31 and engages an undercut bore in the coupling shank 33 to pull the toolholder 32 with the annular flange 34 in axial direction against a frontal engaging surface on the spindle 31.

For centrally locating and axially supporting the toolholder 32, two fixed supporting elements 37, 38 and one radially adjustable supporting element 39 are arranged on the spindle 31 in an annular extension 36 of the frontal end of the receiving socket 30. The centers of the supporting elements 37 to 39 are equally spaced apart circumferentially. The supporting elements 37 to 39 have first, tangentially aligned, plane inner locating surfaces 40, 41, 42 which coact with the conical outer locating surface 43 of the coupling shank 33 and are arranged at the same inclination as these with respect to the axis of rotation 3. The supporting elements 37 to 39 extend radially inwardly into the receiving socket 30 so that the inner diameter in the area of the inner locating surfaces 40 to 42 is smaller than the inner diameter of the receiving socket 30. The supporting elements 37 to 39 define with their upper sides radial engaging surfaces 44, 45, 46 lying in a common plane normal to the axis of rotation 3 and serving to support the annular flange 34 axially. The supporting element 39 is guided for radial movement in a guide 47 and takes support upon a compression spring 48 seeking to urge the supporting element 39 radially inwardly.

Owing to the configuration described, the supporting elements 37 to 39 define with their tangential inner locating surfaces 40 to 42, in coaction with the outer locating surface 43 of the coupling shank 33, three discrete supports of which two are rigid and one is radially adjustable against spring force. Furthermore, the supporting elements 37 to 39 define with their engaging surfaces 44, 45, 46 three discrete supports for the annular flange 34 which are rigid in axial direction. Thanks to these discrete supports, it is possible to centrally locate and coaxially align the toolholder 32 with a high degree of repeat accuracy using a relatively low axial clamping force of the clamping device 35. The compression spring 48 ensures at all times a firm engagement of the coupling shank 33 with the inner locating surfaces 40, 41 so that the radial position of the coupling shank 33 as defined by the latter is reproduced on each repeated clamping operation. Minor locating errors which may result from minor diameter variations between coupling shanks of different toolholders may be compensated for in the unbalance measurement by turning over through 180°.

The invention claimed is:
1. A clamping device of a balancing machine for coaxially clamping a toolholder on a spindle rotary about an axis of rotation, said spindle including at a frontal end a coaxial receiving socket and said toolholder including a coupling shank axially insertable into the frontal end of the spindle, said coupling shank being adapted to be axially clamped in place in the receiving socket by means of releasable clamping means, wherein at least one inner locating surface in the receiving socket, at least one outer locating surface on the coupling shank and, where applicable, one further engaging surface cooperate in order to support the toolholder in coaxial position radially and axially on the spindle, wherein the supporting of the coupling shank in the receiving socket takes place only on discrete supports spaced from each other circumferentially, wherein a first and a second one of the discrete supports are formed by inner and outer locating surfaces and define, in combination, a rigid support in a first radial direction, wherein a third one of the discrete supports is formed by a radially adjustable first supporting element and defines a support in a second radial direction opposite the first radial direction, and wherein the radially adjustable supporting element is carried for radial movement on the spindle or the toolholder and is adjustable against the force of a spring.

2. The clamping device according to claim 1, wherein the discrete supports lie in at least one engagement plane intersecting the axis of rotation.

3. The clamping device according to claim 1, wherein the supporting of the coupling shank in the receiving socket takes place only on discrete supports in a first engagement plane intersecting the axis of rotation and a second engagement plane intersecting the axis of rotation, with inner and outer locating surfaces forming four rigid discrete supports arranged in pairs in the first and second one of the engagement planes and combining to form a rigid support in a radial direction, and wherein in the first and the second engagement plane a third discrete support is formed by a radially adjustable supporting element providing a supporting function in a radial direction opposite the direction of the rigid support.

4. The clamping device according to claim 1, wherein the outer locating surface of the coupling shank is formed by a cylindrical envelope surface or a plurality of cylindrical envelope surfaces.

5. The clamping device according to claim 1, wherein the coupling shank has a conical outer locating surface.

6. The clamping device according to claim 1, wherein the outer locating surface of the coupling shank is formed by sections of a common frusto-conical envelope surface.

7. The clamping device according claim 1, wherein the spindle includes an engaging surface or a plurality of discrete engaging surfaces for axially supporting the toolholder.

8. The clamping device according to claim 1, wherein the discrete supports which lie in the same engagement plane are at the same radial distance from the axis of rotation.

9. The clamping device according to claim 8, wherein the discrete supports of different engagement planes are spaced at different radial distances from the axis of rotation.

10. The clamping device according to claim 1, wherein the inner locating surfaces of the discrete supports are curved in a concave or convex shape or are plane.

11. A clamping device of a balancing machine for coaxially clamping a toolholder on a spindle rotary about an axis of rotation, said spindle including at a frontal end a coaxial receiving socket and said toolholder including a coupling shank axially insertable into the frontal end of the spindle, said coupling shank being adapted to be axially clamped in place in the receiving socket by means of releasable clamping means, and wherein at least one inner locating surface in the receiving socket and at least one outer locating surface on the coupling shank cooperate in order to support the coupling shank on the spindle in a centered position radially and, where applicable, axially, wherein the supporting of the coupling shank in the receiving socket takes place only on discrete supports which are spaced from each other circumferentially, lie in three relatively spaced engagement planes intersecting the axis of rotation and are formed by inner and outer locating surfaces, wherein a first and a second one of the discrete supports are formed in a first engagement plane and define in combination a rigid support in a first radial direction, wherein a third and a fourth one of the discrete supports are formed in a second engagement plane and define in combination a second rigid support in the first radial direction, wherein each of the first discrete support, the second discrete support, the third discrete support, and the fourth discrete support is formed by a respective rigid projection raised relative to the at least one inner locating surface in the receiving socket, wherein each of the respective rigid projections is spaced from any other projection raised relative to the at least one inner locating surface in the receiving socket, and wherein in the third engagement plane lying between the first and the second engagement plane a fifth discrete support is formed which effects a supporting function in a second radial direction opposite the first radial direction.

12. The clamping device according to claim 11, wherein the fifth discrete support is formed by a radially adjustable supporting element.

13. The clamping device according claim 11, wherein the coupling shank has a conical outer locating surface, and wherein the fifth discrete support is rigid.

* * * * *